United States Patent
Laraqui (10) Patent No.: US 9,877,348 B2
(45) Date of Patent: Jan. 23, 2018

(54) METHOD AND APPARATUS FOR ESTABLISHING A BACKHAUL LINK

(71) Applicant: Telefonaktiebolaget L M Ericsson (publ), Stockholm (SE)

(72) Inventor: Kim Laraqui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 101 days.

(21) Appl. No.: 14/769,913

(22) PCT Filed: Feb. 26, 2013

(86) PCT No.: PCT/SE2013/050169
§ 371 (c)(1),
(2) Date: Aug. 24, 2015

(87) PCT Pub. No.: WO2014/133426
PCT Pub. Date: Sep. 4, 2014

(65) Prior Publication Data
US 2016/0007393 A1   Jan. 7, 2016

(51) Int. Cl.
*H04W 76/00* (2009.01)
*H04W 76/02* (2009.01)
(Continued)

(52) U.S. Cl.
CPC .......... *H04W 76/022* (2013.01); *H04L 45/02* (2013.01); *H04L 45/42* (2013.01);
(Continued)

(58) Field of Classification Search
None
See application file for complete search history.

(56) References Cited

U.S. PATENT DOCUMENTS

2002/0159409 A1   10/2002 Wolfe et al.
2009/0093232 A1*   4/2009 Gupta ................... H04L 63/104
                                                         455/410
(Continued)

OTHER PUBLICATIONS

Unknown Author, "Discovery of neighbor eNB IP address", 3GPP TSG-RAN WG3 #61 R3-081821 Jeju Island, Korea XP-002515360 Source: Qualcomm Europe, Aug. 13-22, 2008, 1-5.
(Continued)

*Primary Examiner* — Michael J Moore, Jr.
*Assistant Examiner* — Gautam Sharma
(74) *Attorney, Agent, or Firm* — Murphy, Bilak & Homiller, PLLC (57) ABSTRACT

A method and radio base station for enabling establishment of backhaul links. A method is performed by a first communication network node for establishing a backhaul link (BH) between the first communication network node and a second communication network node (200, 200', 202, 400), wherein one of the first communication network node and the second communication network node is associated to a backhaul network (220). The second communication network node is detected (500), an address of the second communication network node is determined (502), preferably, an IP-address or an Ethernet-address. The address is sent (504) to a backhauling entity (206), the backhauling entity being associated with a third communication network node (204), and at least one of the first communication network node and the second communication network node is located within a coverage of the third communication network node. Routing information regarding the second communication network node is received (506) from the backhauling entity, the routing information being calculated by the backhauling entity, and a backhaul link (BH) between the first communication network node and the second communication network node is established (508) by applying (Continued)

the routing information. By performing routing calculations in a central backhauling entity, embedded RBSs may be designed less complex because less calculation capacity needs to be included, and no routing protocols needs to be stored locally. Moreover, the backhauling entity may select the most appropriate and effective transport mechanism for the backhauling.

18 Claims, 10 Drawing Sheets

(51) Int. Cl.
    *H04W 40/02*     (2009.01)
    *H04L 12/751*     (2013.01)
    *H04L 29/12*     (2006.01)
    *H04W 40/24*     (2009.01)
    *H04L 12/717*     (2013.01)
    *H04W 92/20*     (2009.01)

(52) U.S. Cl.
    CPC ......... *H04L 61/2007* (2013.01); *H04W 40/02* (2013.01); *H04W 40/246* (2013.01); *H04W 92/20* (2013.01)

(56) References Cited

U.S. PATENT DOCUMENTS

| | | | |
|---|---|---|---|
| 2009/0279461 A1 | 11/2009 | Rao et al. | |
| 2009/0286509 A1* | 11/2009 | Huber | G06Q 20/1235 |
| | | | 455/410 |
| 2010/0227603 A1 | 9/2010 | Gupta et al. | |
| 2012/0014319 A1 | 1/2012 | Sun et al. | |
| 2012/0083270 A1* | 4/2012 | Robbins | H04W 4/14 |
| | | | 455/435.1 |

OTHER PUBLICATIONS

Case, J. et al., "Message Processing and Dispatching for the Simple Network Management Protocol (SNMP)", Network Working Group, Request for Comments: 3412, Dec. 2002, 1-43.

McCloghrie, K. et al., "Evolution of the Interfaces Group of MIB-II", Network Working Group, Request for Comments: 1573, Jan. 1994, 1-65.

* cited by examiner

METHOD AND APPARATUS FOR ESTABLISHING A BACKHAUL LINK

TECHNICAL FIELD

The present disclosure relates generally to a method and an apparatus for routing in communication networks, especially for calculation of routing in wireless communication networks.

BACKGROUND

In this description, the term "User Equipment" (UE) will be used to denote any suitable communication terminal adapted to communicate with a radio base station. A UE may be implemented as a mobile phone, a PDA (Personal Digital Assistant), a handheld computer, a laptop computer, etc. A "radio base station" may be implemented as a NodeB, an eNodeB, a repeater, etc.

Even if the radio base stations often have their own respective connections to the backhaul network, they are commonly capable to communicate data via any other radio base station(s) to a backhaul network and the core network. "Backhauling" is a term which is used to denote that a radio base station establishes an association to the core network possibly via one or more base stations and a backhaul network.

"Routing" is a process where a communication network calculates how to forward packets between devices connected to this network. Typically, this is done as follows: Neighbours connected to one another will exchange identities. This information will be flooded throughout the network to all other nodes. Each node will then calculate its own routing, so that eventually all nodes in the network know how to route packets in the network. A radio base station which has been discovering another radio base station via the backhaul links connecting both to one another determines an IP-address of the discovered radio base station, e.g. by pinging possible IP-addresses. By applying the IP-address it connects to the discovered radio base station by applying a routing protocol to setting up a route to the discovered radio base station. After routing, the discovering routing radio base station will be able to transmit and receive communication data with the discovered radio base station.

A backhaul network is an intermediate network arranged to distribute communication of data between radio base stations and a core network. Typically, backhauling networks comprise communication network nodes as radio network controllers, etc.

Figure 1:
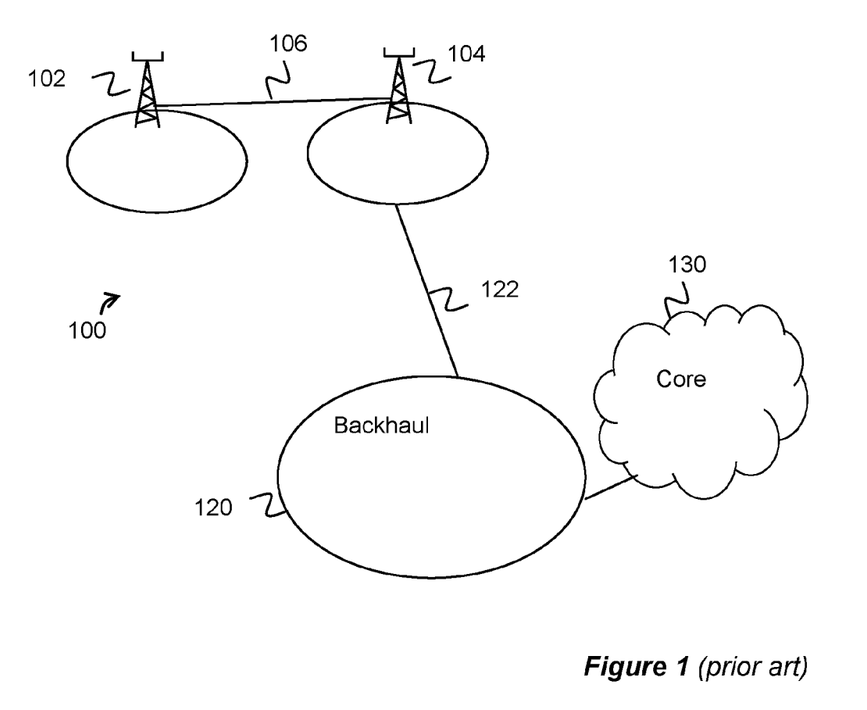
FIG. 1 is an environmental illustration of a backhauling scenario, according to the prior art.

With reference to FIG. 1, which is a schematic environmental overview, a scenario where communication two radio base stations 102, 104 routes a backhaul link between one another will now be described.

In a radio access network 100 a plurality of radio base stations 102, 104 are arranged to communicate data with a core network 130 via a backhaul network 120. Generally, all radio base stations do not necessarily have their own dedicated connections 122 to a backhaul network 120, and thereby to the core network 130. The radio base stations 102, 104 are instead, typically, connected to the backhaul network 120 via each other. This is particularly true for indoor solutions, but is also very common in currently deployed outdoor macro RBS solutions. Such connections 106 are physical connections, capable to convey control data, e.g. fibres, wireless links, or cables. However, the radio base stations 102, 104 are not able to communicate communication data on these physical connections 106 before a backhaul link is routed, as described above.

Mobile backhauling, be it for small cells or macro cells, rely on two key technologies to operate, namely packet forwarding protocols for communication data between radio base stations on backhaul links, and routing protocols for exchanging routing information when establishing the backhaul links.

Some examples of Packet forwarding protocols are: Ethernet, IP (Internet Protocol) or MPLS (Multi-Protocol Label Switching), or combinations of them. Examples of routing protocols which enables routers/switches to exchange routing information with one another are: Ethernet Tree-Spanning, OSPF (Open Shortest Path First), RIP (Routing Information Protocol), IS-IS (Intermediate-System to Intermediate-System), BGP4 (Border Gateway Protocol 4). Depending on needs or operator strategies, different networks often deploy different technologies, e.g. some will prefer Ethernet based backhaul, whilst others will prefer MPLS.

There are numbers of reasons beyond selections of protocols/technologies, e.g. security, network management, and MBH (Mobile BackHaul) network deployment.

There is a need to effectively and flexible manage establishing backhaul links in radio access network, without increasing the amount of signalling information.

SUMMARY

It would be desirable to achieve efficient establishing of backhaul links between radio base stations. It is an object of described solution to address at least some of the issues outlined above. Further, it is an object to provide a mechanism for enabling appropriate backhaul links. These objects may be met by a method and a communication network node according to the attached independent claims.

According to one aspect a method performed by a first communication network node is provided for establishing a backhaul link between the first communication network node and a second communication network node, wherein one of the first communication network node and the second communication network node are associated to a backhaul network. The method comprises to detecting the second communication network node, determining an address of the second communication network node, preferably, an IP-address or an Ethernet-address. The method comprises further to sending the determined address to a backhauling entity, where the backhauling entity is associated with a third communication network node, and at least one of the first communication network node and the second communication network node is located within a coverage of the third communication network node. Moreover, the method comprises to receiving, from the backhauling entity, routing information regarding the second communication network node, the routing information being calculated by the backhauling entity, and establishing a backhaul link between the first communication network node and the second communication network node by applying the routing information.

In one exemplifying embodiment, both the first communication network node and the second communication network node may be located within the coverage area of the third communication network node and sending the address and receiving the routing information may be performed by applying an SMS service or by applying a modelled wireless link between the first communication network node and the third communication network node. In another exemplifying embodiment, the first communication network node is located outside the coverage area of the third communication network node and sending the address and receiving the routing information is performed via the second communication network node according to an in-band protocol.

According to another aspect a first communication network node is provided for establishing a backhaul link between the first communication network node and a second communication network node, wherein one of the first communication network node and the second communication network node are associated to a backhaul network. The first communication network node comprises a communication port, a detecting unit adapted to detect that the communication port is active, and a determination unit adapted to determine an IP-address of the second communication network node which is associated with the port. Furthermore, the first communication network node comprises a communication unit adapted to providing the IP-address to the backhauling entity. The backhauling entity is associated with a third communication network node, and one of the first communication network node and the second communication network node is located within a coverage area of the third communication network node. The communication unit is further adapted to obtain from the backhauling entity routing information regarding the second communication network node, the routing information being calculated by the backhauling entity based on the address. The first communication network node comprises also a switching unit adapted to establish a backhaul link between the first communication network node and the second communication network node, by applying the routing information.

In one exemplifying embodiment, the communication unit may be implemented as an embedded UE. The first communication network node may further comprise a forward information storage, adapted to store the received routing information. Furthermore, the first communication network node may be implemented as a radio base station, e.g. a NodeB, an eNodeB, or a Wifi radio base station, which may be adapted to communicate in accordance with any standard of: CDMA, WCDMA, LTE, LTE Advanced, and Wifi.

According to a further aspect, a method performed by a backhauling entity is provided for enabling establishment of a backhaul link between a first communication network node and a second communication network node. One of the first communication network node and the second communication network node is associated with a backhaul network, and the backhauling entity is associated with a third communication network node. The method comprising to obtaining, from the first communication network node, an address of a second communication network node determined by the first communication network node. At least one of the first communication network node and the second communication network node is located within a coverage area of the third communication network node. Furthermore the method comprising to calculating a routing information regarding the second communication network node, at least based on the address, and providing the routing information to the first communication network node, to be applied when establishing the backhaul link. In one possible embodiment, the backhauling entity may base the calculation on further information of the second communication network node, or stored information in the routing entity of at least one further communication network node.

According to a further aspect, a backhauling entity is provided for enabling establishment of a backhaul link between a first communication network node and a second communication network node. One of the first communication network node and the second communication network node is associated to a backhaul network, and the backhauling entity is associated with a third communication network node. The backhauling entity comprises a communication unit adapted to obtaining an address of the second communication network from the first communication network node, wherein at least one of the first communication network node and the second communication network node is present in a coverage area of the third communication network node. Furthermore, the backhauling entity comprises a calculation unit adapted to calculate a routing information for the second communication network node based on the received address, and the communication unit is further adapted to provide the routing information to the first communication network node to be applied when establishing the backhaul link.

By arranging a central located backhauling entity and calculate routing information therein, knowledge of other communication network nodes and established backhaul links may be applied, which may result in more appropriate routing information.

By performing routing calculations in a central backhauling entity, embedded RBSs may be designed less complex because less calculation capacity needs to be included, and no routing protocols needs to be stored locally. Moreover, the backhauling entity may select the most appropriate and effective transport mechanism for the backhauling.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which for enabling more effective management in mobile backhauling.

An embedded first radio base station (RBS) in a wireless communication network discovers another embedded second RBS which is active. The first RBS determines an address of the second RBS, e.g. IP-address and provides to a backhauling entity associated with an embedding third RBS which covers at least one of the first and the second RBSs. Based on the information, the backhauling entity calculates routing information, which is returned to the first RBS to be used when establishing a backhaul link between the first RBS and the second RBS.

In traditional backhauling, the RBSs calculate routing information, e.g. Forwarding Information Bases (FIBS) which are stored therein and define the backhaul connections to other RBSs. The RBSs apply these FIBS when deciding which of its communication ports to apply when sending data to specific addresses, e.g. IP-addresses.

Figure 2A:
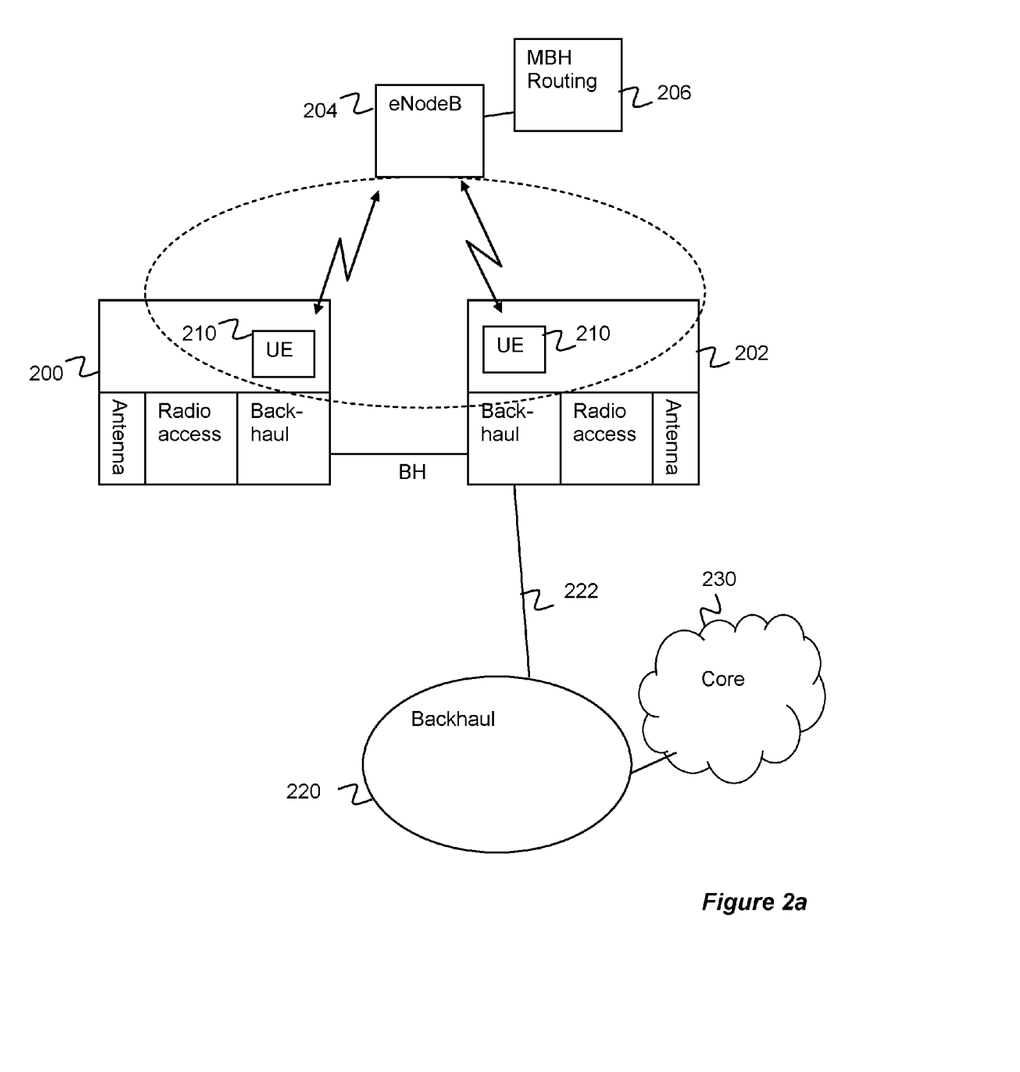
FIG. 2a-2c are environmental illustrations of a backhauling scenarios, according to some possible embodiments.

With reference to FIG. 2a, which is a schematic environmental illustration, a scenario where two eNodeBs establish a backhaul link between each other will now be described in accordance with one exemplifying embodiment.

In a radio access network, two eNodeBs 200, 202 are located in a coverage area (dotted line) of a covering eNodeB 204. The first eNodeB 200 is associated with the core network 230 via a backhaul network 220. Each of the eNodeBs 200, 202 is arranged to serve a plurality of respective User Equipments (UE) (not illustrated). Furthermore, each of the eNodeBs 200, 202 has a smaller covering area than the covering area of the eNodeB 204. The eNodeBs 200, 202 comprise antennas and radio access functionality to serve their respective covered UEs, but they also comprise backhaul functionality to establish backhaul links BH between each other. The backhauling links BH are applied for communicating data with the backhaul network, and enable eNodeBs which not have their own dedicated connections 222 to backhauling networks 220 to communicate data with the core network 230.

The described communication network is a so called embedded network, where covered eNodeBs 200, 202 are located within a coverage area of an embedding eNodeB 204. In this exemplifying embodiment, a specific backhauling entity 206 is arranged at the embedding eNodeB 204 in order to perform the route calculations for the embedded eNodeBs 200, 202. The embedded eNodeBs 200, 202 comprise a UE-unit 210, 212 respectively, arranged to enable the embedded eNodeBs 200, 202 to communicate data with the embedding eNodeB 204.

As stated above, in traditional mobile backhauling the RBSs calculate their respective FIBS themselves. However, for dynamic communication network, and especially ad-hoc networks routing calculations may be substantial, especially for small area RBSs as pico- or femto-RBSs, where calculation capacity is limited.

The backhauling entity 206 is associated to the embedding eNodeB 204. Even if the backhauling entity 206 is here illustrated as a separate unit associated with the embedding eNodeB 204, the concept is not limited thereto. The backhauling entity 206 may be arranged differently, e.g. as an integrated function or card in the embedding eNodeB 204.

When a first eNodeB 200 detects activity on one of its communication ports, it determines the IP-address of another second eNodeB 202 being active on the communication port and provides the IP-address to the backhauling entity 206. The first eNodeB 200 uses its UE-unit 210 to transmit the IP-address to the backhauling entity 206 via the embedding eNodeB 204. The backhauling entity 206 uses the received IP-address and calculates a FIB for the first eNodeB 200, and returns the FIB via the embedding eNodeB 204 and the UE-unit 210. By using the received FIB, the first eNodeB 200 establishes a backhaul link BH to the second eNodeB 202.

The established backhaul link BH enables the first eNodeB 200 to communicate data with the core network 230 via second eNodeB 202 and the backhaul network 220. The schematically described method will be described more detailed below in other embodiments.

Figure 2B:
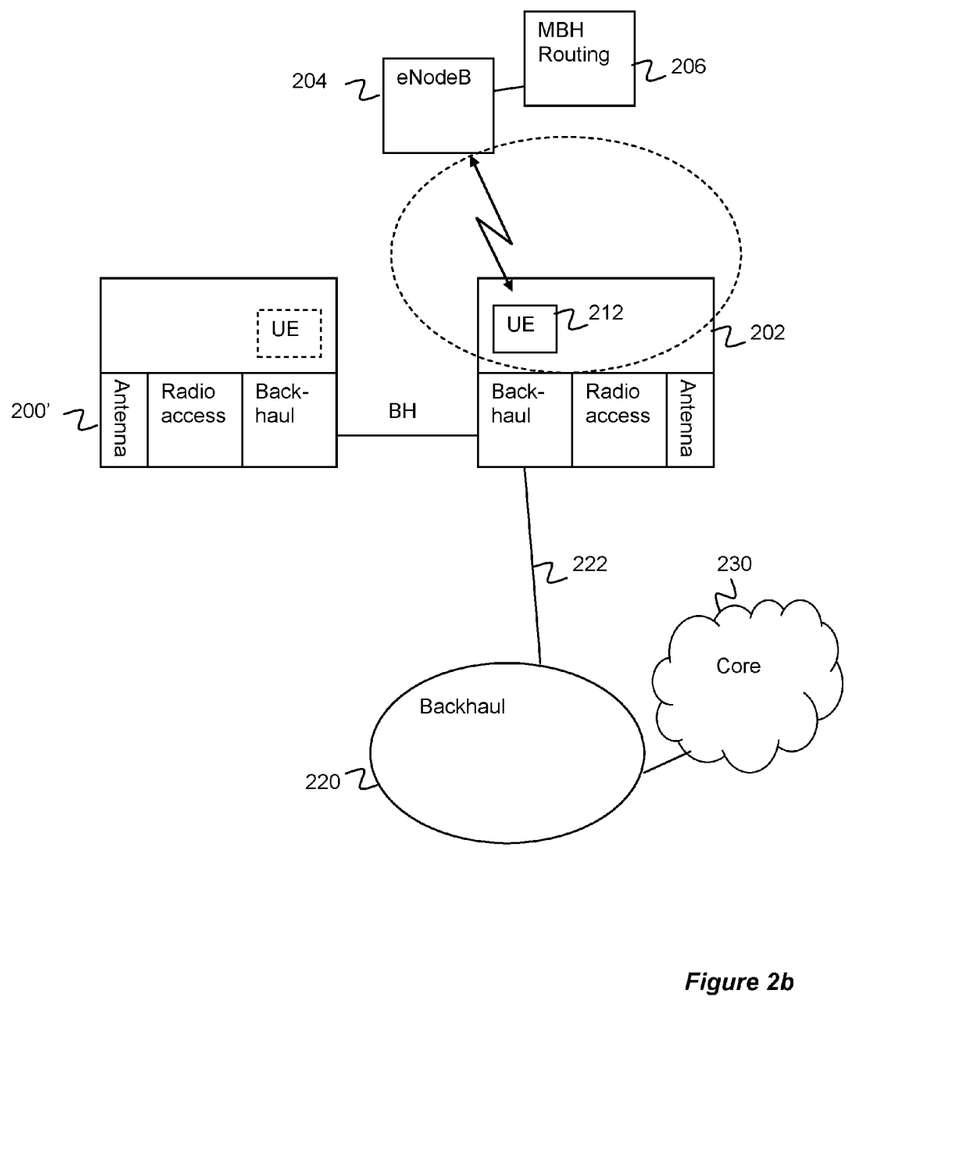

With reference to FIG. 2b, which is a schematic environmental illustration, a scenario where two eNodeBs establish a backhaul link between each other will now be described in accordance with one exemplifying embodiment. The scenario which will be described is related to the above describe scenario, however, the first eNodeB 200' differs from the eNodeB 200 described above in that the first eNodeB 200' is not located within a coverage area of the third eNodeB 204. In addition, the first eNodeB 200' does not need any UE-unit.

The described communication network is to be seen as an embedded network, even if the first eNodeB 200' is not covered by the covering area (dotted) of the embedding eNodeB 204.

When the first eNodeB 200' detects activity on one of its communication ports, it determines the IP-address of another second eNodeB 202 being active on the communication port and provides the IP-address to the backhauling entity 206. However, because the first eNodeB 200' is not located within the coverage area of the third eNodeB 204, first eNodeB 200' transmits the IP-address to the backhauling entity 206 via a physical connection to the second eNodeB 202, in accordance with any suitable in-band communication protocol, e.g. ILMI (Interim Local Management Interface) for ATM (Asynchronous Transfer Mode). The second eNodeB 202 uses its UE-unit 212 to forward the IP-address to the third eNodeB 204, which is associated to the backhauling entity 206.

Similarly, to the in the example described above in connection with FIG. 2a, the backhauling entity 206 uses the received IP-address and calculates a FIB for the first eNodeB 200'. The FIB is then forwarded to the first eNodeB 200' via the third eNodeB 204 and the second eNodeB 202, by applying the UE-unit 212 between the third eNodeB 204 and the second eNodeB 202, and applying the physical link between the second eNodeB 202 and the first eNodeB 200' in accordance with the in-band protocol. By using the received FIB, the first eNodeB 200' establishes a backhaul link BH to the second eNodeB 202.

Thus, also eNodeBs 200' which are not located within a coverage area of an embedding eNodeB 204 may apply the central backhauling entity 206 when establishing a backhaul link.

Figure 2C:
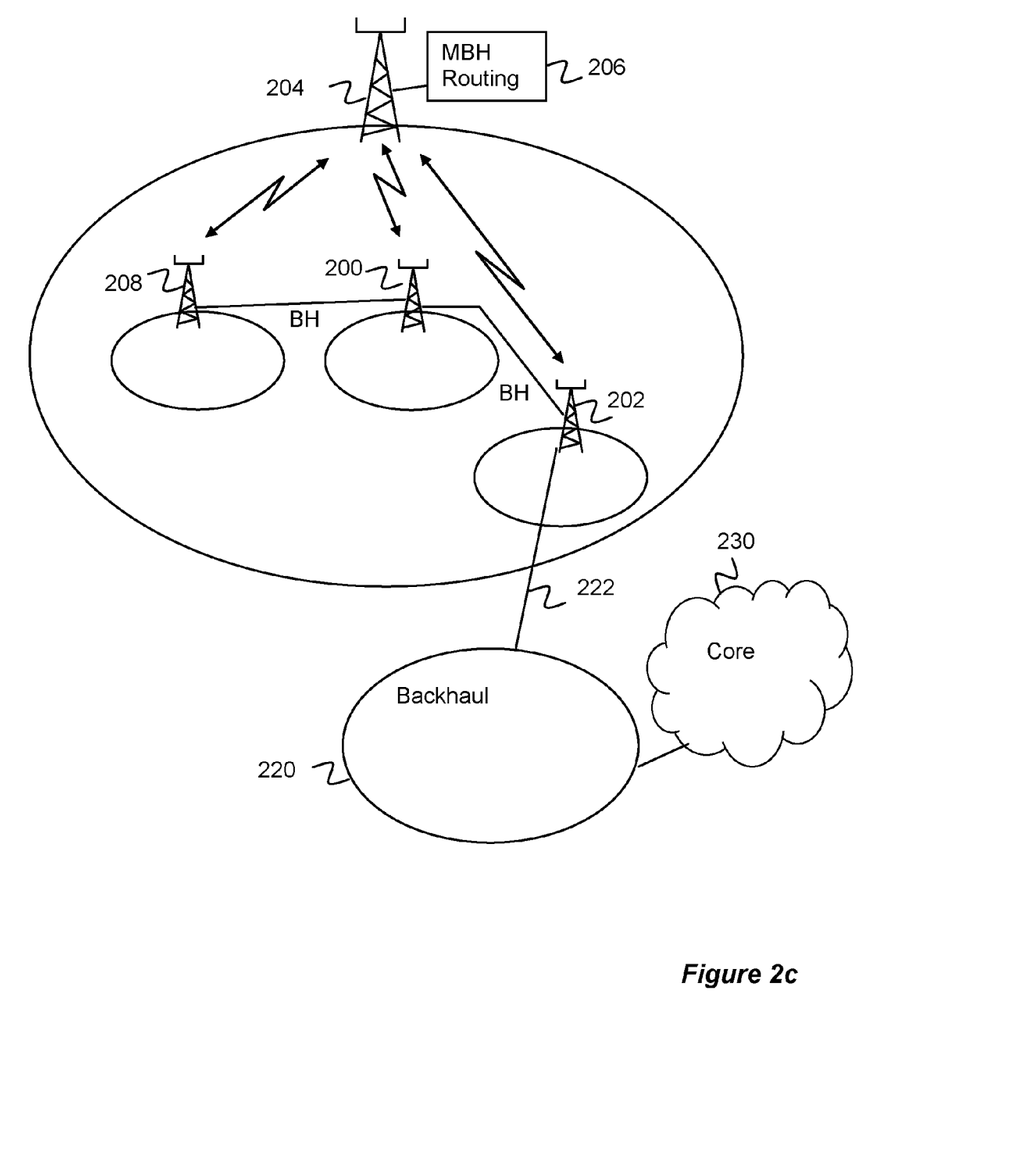

With reference to FIG. 2c, which is a schematic environmental illustration, a scenario where three eNodeBs establish backhaul links between each other will now be described in accordance with one exemplifying embodiment. The scenario which will be described is based on the scenario described in connection with FIG. 2a. A first eNodeB 200 is associated with a second eNodeB 202 and both the first eNodeB 200 and the second eNodeB 202 are located in a covering area of a third eNodeB 204. A backhauling entity 206 is associated with the third eNodeB 204. A backhaul link is established between the first eNodeB 200 and the second eNodeB 202, as described above.

In addition to the scenario of FIG. 2a, a fourth embedded eNodeB 208 detects the first eNodeB 200, determines the IP-address of the first eNodeB 200 and transmits the IP-address to the backhauling entity 206 by applying a UE-unit (not shown) comprised in the fourth eNodeB 208. Correspondingly to what was described above, the backhauling entity 206 calculates a FIB for the fourth eNodeB 208, which the fourth eNodeB will use when establishing a backhaul link between the fourth eNodeB 208 and the first eNodeB 200.

Thereby, by applying the established backhaul links BH, the fourth eNodeB is enabled to communicate with the backhaul network via the first eNodeB 200 and the second eNodeB 202.

It is to be noted that even if the exemplifying embodiments described above, define that embedded eNodeBs initiate the calculation of FIBS, the designer of the system is free to implement the process differently within the concept. For instance, the backhauling entity 206 may be instructed to periodically polling the embedded eNodeBs 200, 202, 208 in order to detecting and determining changes in network structures, and calculating updated FIBS to providing to the embedded eNodeBs for establishing of backhaul links. Thereby, the backhauling entity is enabled to monitor network structure changes, calculating up-dated FIBS to providing to the embedded eNodeBs, for establishing actual backhaul links.

Figure 3:
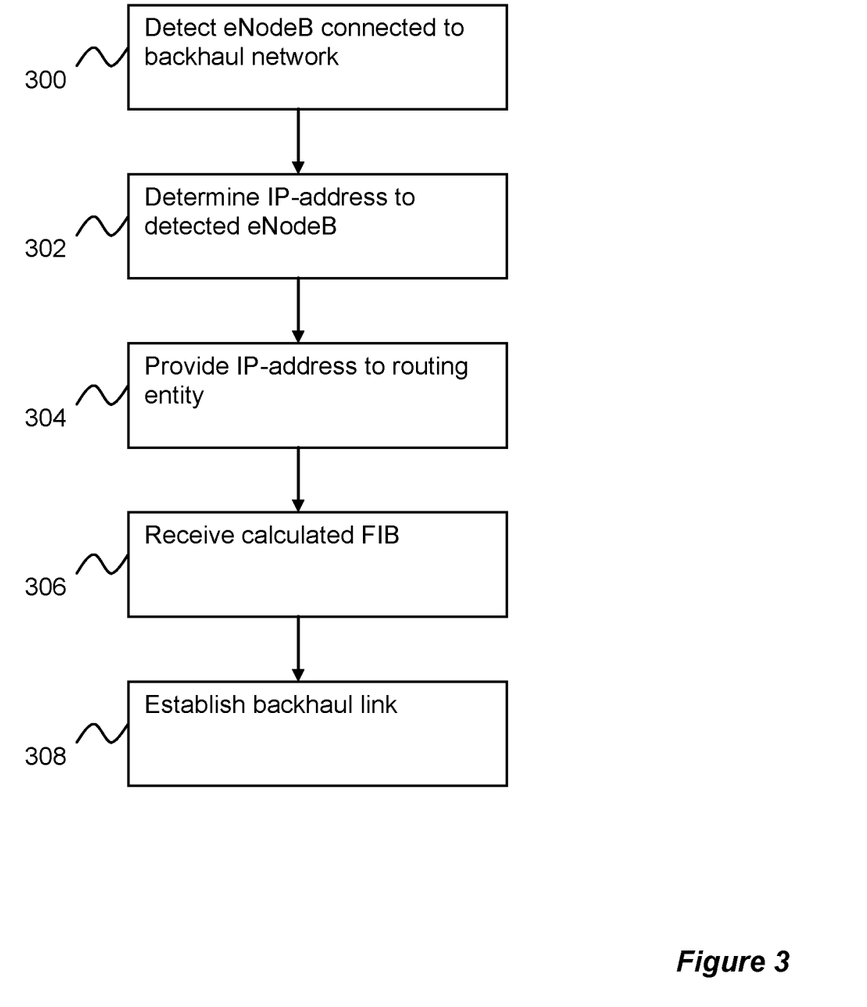
FIG. 3 is a flow chart illustrating a procedure in a node, according to further possible embodiments.

With reference to FIG. 3, which is a schematic flow chart, a method performed by radio base station for establishing a backhaul link will now be described in accordance with one exemplifying embodiment.

The radio base station is here implemented as an eNodeB in a LTE communication network, but in a corresponding way and as said above in connection with other exemplifying embodiments, the concept may be applied also for other suitable radio base stations and corresponding communication network technologies.

In a communication network, two embedded eNodeBs are located in a covering are of an embedding eNodeB. The two embedded eNodeBs are connected to each other, e.g. by a cable, fibre, communication link, etc. One of the embedded eNodeBs are further associated with a backhaul network, which is connected to a core network.

When the embedded eNodeBs are connected to each other, the first eNodeB detects the second eNodeB on the connection between them, in a first action 300, and determines an IP-address of the second eNodeB in a following action 302. When detecting and determining, an in-band communication interface, as e.g. ILMI (Interim Local Management Interface) is applied. Furthermore, additional information may in addition be shared over the in-band communication interface, as e.g. regarding identities, capabilities, supported backhaul protocols, QoS (Quality of Service) parameters, etc. For instance, the determining of IP-addresses may be performed by the first eNodeB by pinging possible IP-addresses belonging to the same communication network as the first eNodeB.

The embedded eNodeB comprise a UE-unit and the backhauling entity is associated with the embedding eNodeB. The embedded eNodeB uses its UE-unit for providing the determined IP-address and eventual further determined information to the backhauling entity via the embedding eNodeB, e.g. link status information of established links of the eNodeBs, etc. in a following action 304. The actual provision is performed by applying any suitable 3GPP (3$^{rd}$ Generation Partnership Project) bearer mechanism, as SMS or a modelled wireless link and in accordance with a suitable communication protocol as SNMP (Simple Network Management Protocol), the protocol capability of each embedded eNodeB may be communicated before a protocol is selected for the backhaul link to be established. This will allow for diverse protocols to be supported over time. As defined above in another embodiment, the backhauling entity may be arranged in different ways, e.g. as a function in the embedding eNodeB, or as a separate unit associated to the embedding eNodeB.

By applying the received information, e.g. the IP-address of the second eNodeB the backhauling entity calculates a Forward Information Base (FIB) for the first eNodeB. The more information the backhauling entity have access to, the more appropriate calculation of the FIB.

In a subsequent action 306, the first eNodeB receives the calculated FIB via the embedding eNodeB. Correspondingly to the provision of information in action 304, the reception is performed via the suitable 3GPP bearer mechanism, e.g. SMS. In a final action 308 the first eNodeB establishes a backhaul link to the second eNodeB according to the received FIB.

When the backhaul link is established, a suitable communication protocol will be applied for communicating data on the backhaul link, as e.g. RIP (Routing Information Protocol).

The process described above defines the situation where one eNodeB establishes a backhaul link to another eNodeB. However, in a real communication network with further eNodeBs, the other eNodeBs perform the corresponding process for establishing backhaul links between each other. Moreover, the backhauling entity may then also make use of its knowledge of other eNodeBs when calculating routing information.

By recursively repeating the described process until all connected eNodeBs have been identified, routing information can be provisioned by the backhauling entity to all relevant connected eNodeBs. Thereby, up-dated FIBS may be provisioned to the embedded eNodeBs, resulting in more effective establishing of backhaul links, and more appropriate backhaul links in accordance with the actual network structure.

Figure 4:
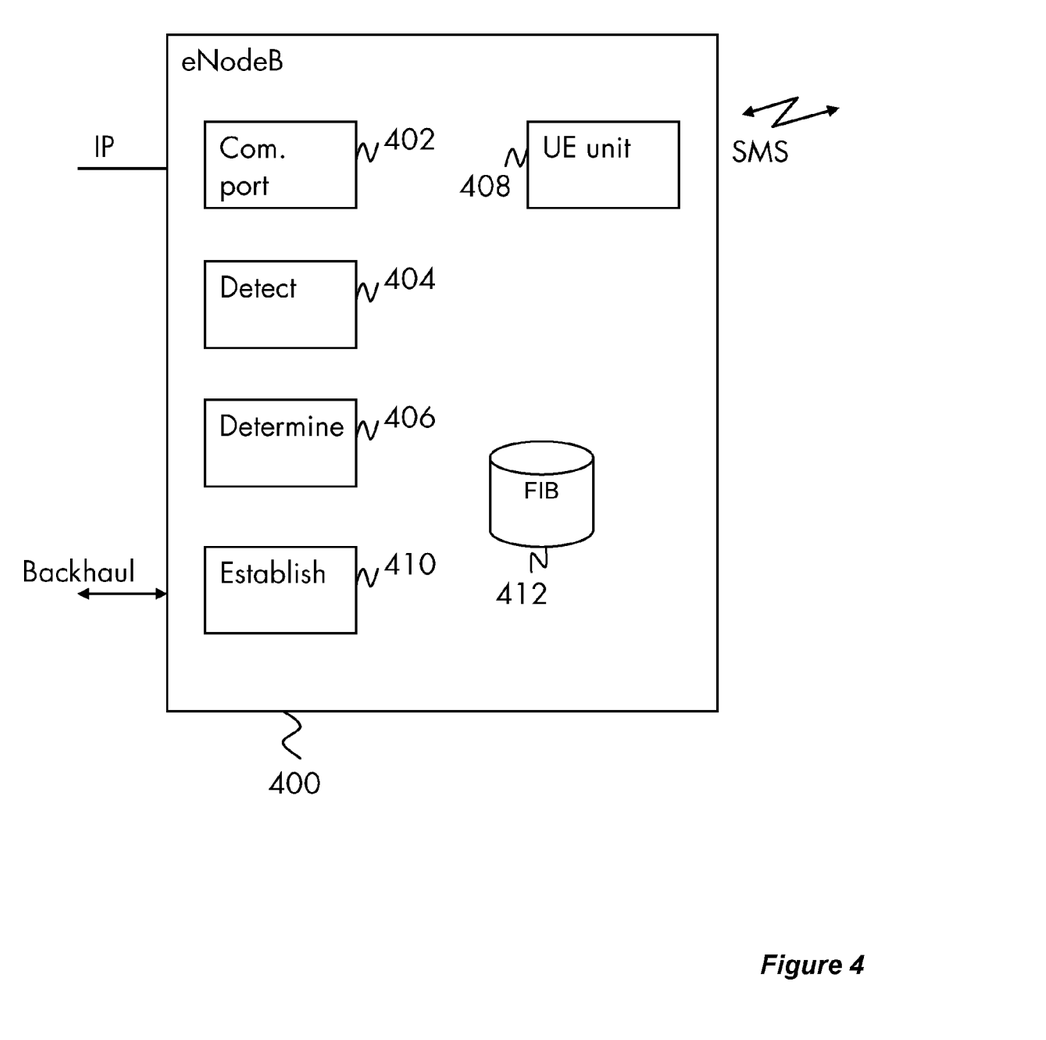
FIG. 4 is a block diagram illustrating a node, according to some possible embodiments.

With reference to FIG. 4, which is a schematic block diagram, an embedded eNodeB 400 will now be described in accordance with one exemplifying embodiment. The eNodeB 400 comprises a communication port 402, a detection unit 404, a determining unit 406, a UE-unit 408, and a switching unit 410. In addition, the eNodeB 400 may also comprise a forward information storage 412.

The eNodeB 400 is adapted to be connected to other eNodeBs via physical connections, as optical fibres, cables, wireless links, etc. Furthermore, the eNodeB 400 is adapted to be embedded by another embedding eNodeB, i.e. being located within a coverage area of the embedding eNodeB and communicating with the embedding eNodeB. The communication port 402 is adapted to transmit and receive data on the physical link, e.g. in accordance with IP (Internet Protocol). Typically, embedded eNodeBs have a plurality of physical connections and respective communication ports are arranged to manage data communication on the physical connections.

The detecting unit 404 is adapted to detect when data is communicated on the communication port 402. The determining unit 406 is adapted to obtain information of the units communicating data on the physical connection, e.g. IP-addresses of other communicating eNodeBs. Such determined information will be transmitted to a backhauling entity (not shown) associated with the embedding eNodeB. In order to transmit the information, the UE-unit 408 is arranged in the eNodeB 400. The UE-unit 408 is adapted to apply a suitable 3GPP bearer mechanism, e.g. SMS, to transmit the determined information to the backhauling entity, which will make use of the information and calculate forwarding information, e.g. in form of a FIB (Forwarding Information Base), to be returned to the eNodeB 400, by applying the UE-unit 408.

The switching unit 410 is adapted to establish a backhaul link to a second eNodeB, according to the received FIB. The second eNodeB is associated to the core network via a backhaul network. Thereby the eNodeB 400 is enabled to apply the backhaul link for communicating data with the core network.

In another exemplifying embodiment, which is based on the one describe above, the eNodeB 400 may in addition comprise a forward information storage 412, which is adapted to store the received FIB. Thereby, the eNodeB 400 is enabled to establish a new backhaul link if needed, without requiring that a new FIB has to be calculated.

Moreover, the eNodeB 400 may be adapted to act as a proxy for other connected eNodeBs which are not located within the coverage area of the embedding eNodeB. The eNodeB 400 may therefore be provided with functionality for forwarding received routing information to the backhauling entity, receive FIBS regarding the other eNodeBs and forwarding to the other eNodeBs accordingly.

Figure 5:
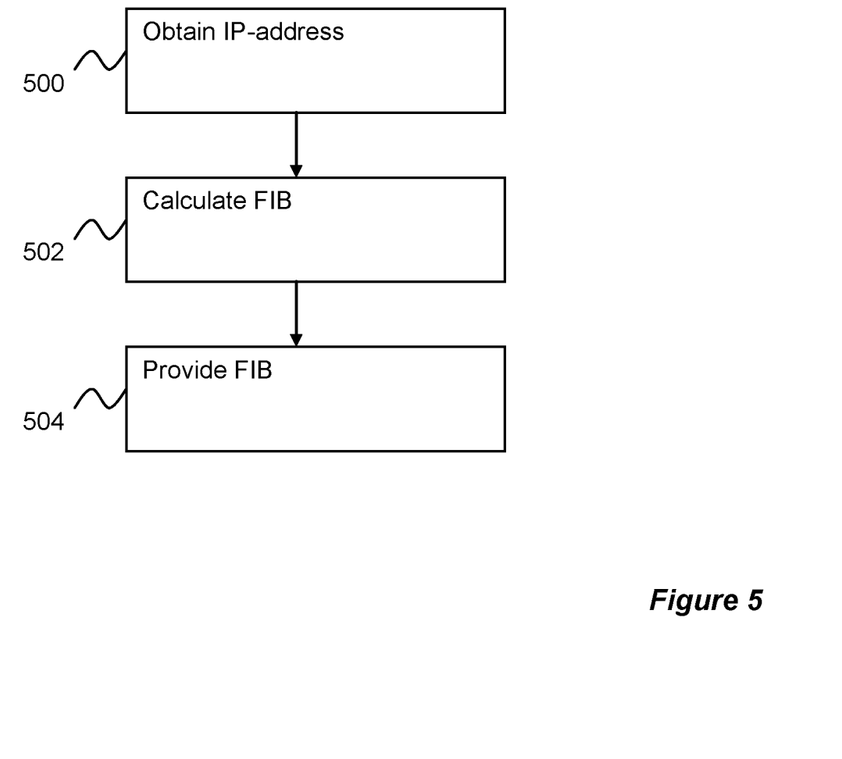
FIG. 5 is a flow chart illustrating a procedure in a backhauling entity, according to further possible embodiments.

With reference to FIG. 5, which is a schematic flow chart, a method performed by backhauling entity for enabling establishment of a backhaul link between two embedded eNodeBs will now be described in accordance with one exemplifying embodiment.

The embedded eNodeBs are located within a coverage area of an embedding eNodeB. The backhauling entity is associated with the embedding eNodeB. When one embedded eNodeB has detected another embedded eNodeB to which it will establish a backhaul link, the first eNodeB provides determined information regarding the second eNodeB to the backhauling entity.

In a first action 500, the backhauling entity receives the determined information from the first embedded eNodeB via the embedding eNodeB. Based on the received information, the backhauling entity calculates a FIB for the first embedded eNodeB, in a following action 502. In a final action 504, the FIB is sent back to the first embedded eNodeB to be applied when the first embedded eNodeB establishing the backhaul link.

Figure 6:
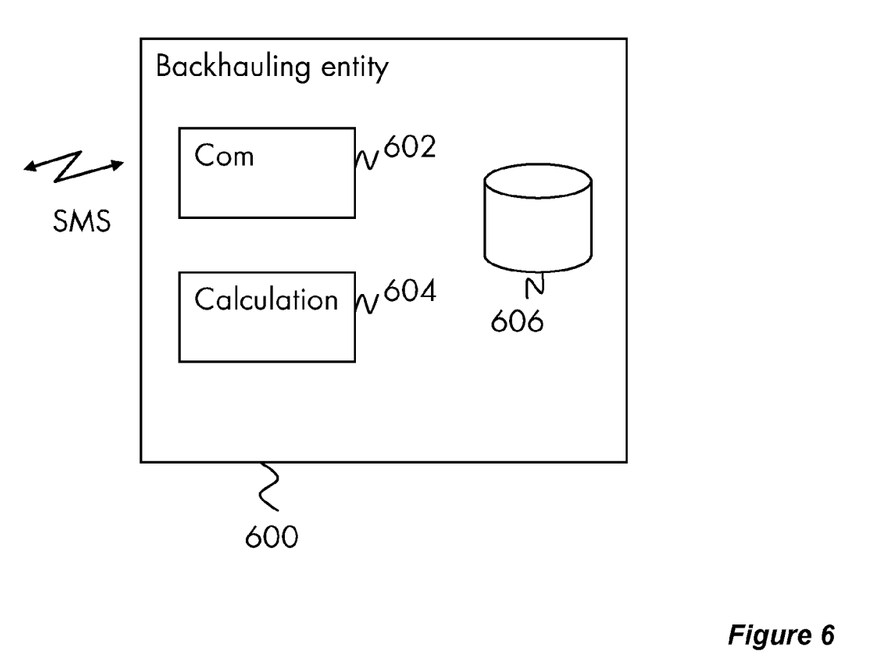
FIG. 6 is a block diagram illustrating a backhauling entity, according to some possible embodiments.

With reference to FIG. 6, which is a schematic block diagram, a backhauling entity 600 for enabling establishment of a backhaul link between two embedded eNodeBs will now be described in accordance with one exemplifying embodiment. The backhauling entity 600 comprises a communication unit 602 and a calculation unit 604.

The backhauling entity 600 is associated to an embedding eNodeB, and is adapted to calculate routing information for embedded eNodeBs, according to which the embedded eNodeBs will establish backhaul links between each other.

The communication unit 602 is adapted to receive, from a first embedded eNodeB, information regarding a second embedded eNodeB, especially an address as IP-address, etc. As describe above, the backhauling entity 600 is associated with an embedding eNodeB, and the communication unit 602 is adapted to receive the information via the embedding eNodeB.

The calculation unit 604 is arranged to apply the received information for calculating routing information regarding the first eNodeB. Examples of received information are: IP-addresses or Ethernet-addresses, capabilities of the eNodeBs, supported backhaul transport protocols, etc., and the calculation is typically a FIB.

The communication unit 602 is further adapted to send the calculated FIB, via the embedding eNodeB, to the first embedded eNodeB to enable the embedded eNodeB to establish the backhaul link according to the FIB.

By arranging a specific centrally located backhauling entity, calculation capacity of the embedded eNodeBs can be released. Furthermore, the centrally located backhauling entity can make use of information of other eNodeBs and produce more appropriate FIBS. For instance, by applying knowledge which backhaul protocols the embedded eNodeBs support, the backhauling entity may select suitable protocols for the backhaul links.

In addition, the backhauling entity 600 may be equipped with a storage 606 and the communication unit 600 may be adapted to store received information in the storage 606, e.g. as a topology database. For instance, such a topology database may be implemented as an OSPF (Open Shortest Link First) Link State Database. The calculation unit 604 may be adapted to store calculated FIBS in the storage 606. Thereby, the calculation unit is enabled to apply also stored information, which may result in more optimal and appropriate FIBS.

Figure 7:
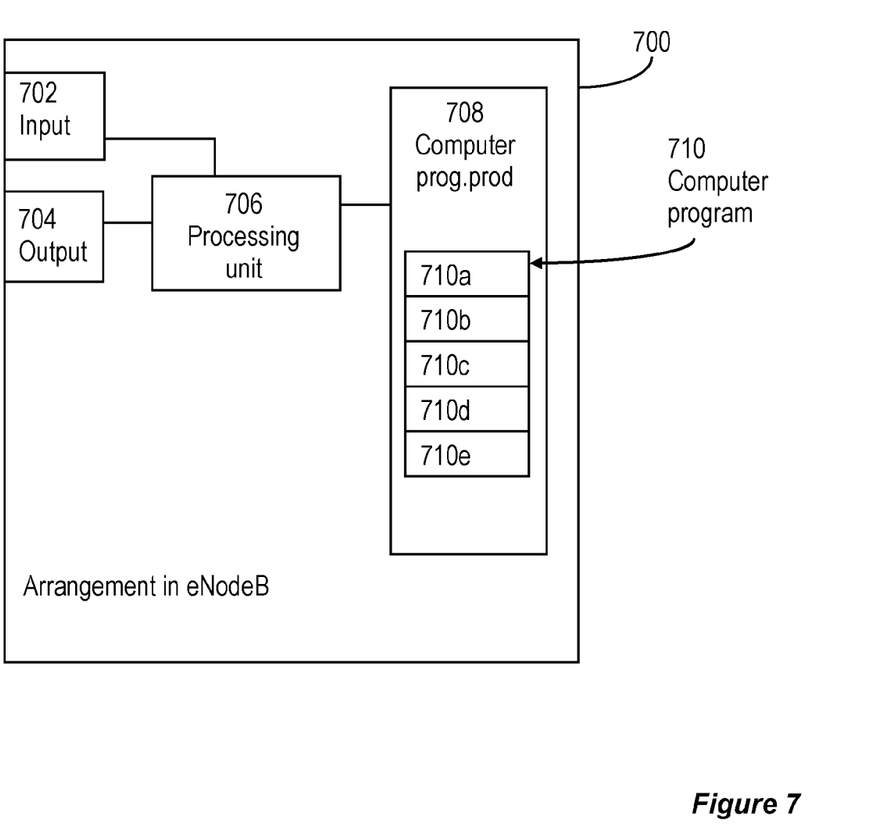
FIG. 7-8 are block diagrams illustrating arrangements, according to some possible embodiments.

With reference to FIG. 7, which is a schematic block diagram, an arrangement 700 in a communication network node in a first network domain will now be described in accordance with an exemplifying embodiment. Comprised in the arrangement 700 in the node is here a processing unit 706, e.g. with a DSP (Digital Signal Processor). The processing unit 706 may be a single unit or a plurality of units to perform different actions of procedures described herein. The arrangement 700 in the node in the first network domain may also comprise an input unit 702 for receiving signals from other entities, and an output unit 704 for providing signal(s) to other entities. The input unit and the output unit may be arranged as an integrated entity or as illustrated in the example of FIG. 4, as one or more interfaces 402/408.

Furthermore, the arrangement 700 in the node comprises at least one computer program product 708 in the form of a non-volatile memory, e.g. an EEPROM (Electrically Erasable Programmable Read-Only Memory), a flash memory and a hard drive. The computer program product 708 comprises a computer program 710, which comprises code means, which when executed in the processing unit 706 in the arrangement 700 in the node causes the arrangement 700 in the node to perform the actions e.g. of the procedure described earlier in conjunction with FIG. 3.

The computer program 710 may be configured as a computer program code structured in computer program modules 710a-710e. Hence, in an exemplifying embodiment, the code means in the computer program of the arrangement 700 in the node may comprise a first detecting unit 710a, or module, for detecting a first eNodeB. The computer program may further comprise a determining unit 710b, or module, for determining an address of the first eNodeB. The computer program may further comprise a sending unit 410c, or module, for sending the determined address to a backhauling entity. The computer program may further comprise a receiving unit 410d, or module, for receiving routing information from the backhauling entity. The computer program may further comprise a switching unit 410e, or module, for establishing a backhaul link.

The computer program modules could essentially perform the actions of the flow illustrated in FIG. 3, to emulate the node 400 of FIG. 4. In other words, when the different computer program modules are executed in the processing unit 706, they may correspond to the units 402-410 of FIG. 4.

Figure 8:
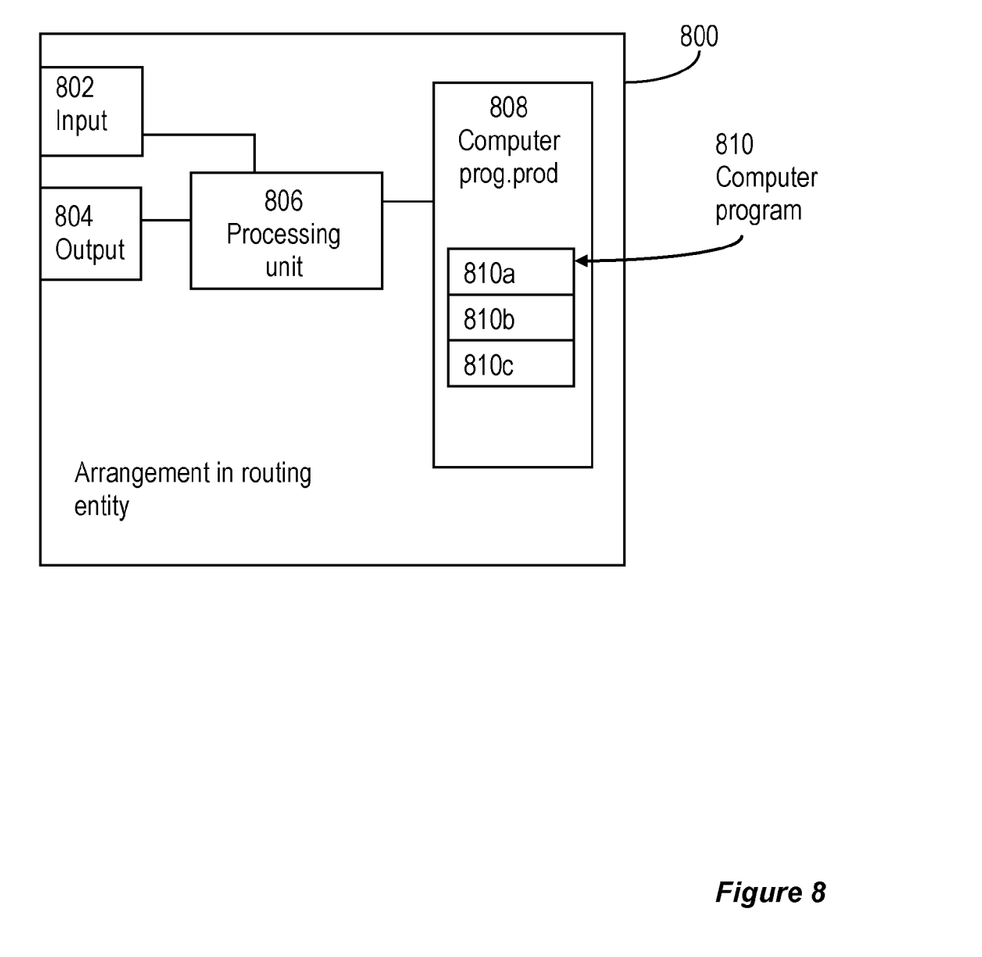

With reference to FIG. 8, which is a schematic block diagram, an arrangement 800 in a backhauling entity in a first network domain will now be described in accordance with an exemplifying embodiment. Comprised in the arrangement 800 in the node is here a processing unit 806, e.g. with a DSP (Digital Signal Processor). The processing unit 806 may be a single unit or a plurality of units to perform different actions of procedures described herein. The arrangement 800 in the node in the first network domain may also comprise an input unit 802 for receiving signals from other entities, and an output unit 804 for providing signal(s) to other entities. The input unit and the output unit may be arranged as an integrated entity as illustrated in the example of FIG. 6, or as one or more interfaces.

Furthermore, the arrangement 800 in the node comprises at least one computer program product 808 in the form of a non-volatile memory, e.g. an EEPROM (Electrically Erasable Programmable Read-Only Memory), a flash memory and a hard drive. The computer program product 808 comprises a computer program 810, which comprises code means, which when executed in the processing unit 806 in the arrangement 800 in the node causes the arrangement 800 in the node to perform the actions e.g. of the procedure described earlier in conjunction with FIG. 5.

The computer program 810 may be configured as a computer program code structured in computer program modules 810a-810c. Hence, in an exemplifying embodiment, the code means in the computer program of the arrangement 800 in the node may comprise an obtaining unit 810a, or module, for obtaining an address from a first eNodeB. The computer program may further comprise a calculating unit 810b, or module, for calculating routing information for the first eNodeB. The computer program may further comprise a providing unit 410c, or module, for providing the routing information to the first eNodeB.

The computer program modules could essentially perform the actions of the flow illustrated in FIG. 5, to emulate the node 600 of FIG. 6. In other words, when the different computer program modules are executed in the processing unit 806, they may correspond to the units 602-604 of FIG. 6.

Although the code means in the examples disclosed above in conjunction with FIGS. 7 and 8 may be implemented as computer program modules which when executed in the processing unit causes the node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the node in the first network domain.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

In the exemplifying embodiments described above, the RBSs are implemented as eNodeBs. However, the concept is not limited to eNodeBs and LTE/LTE Advanced technology. When designing a communication network according to the concept, a designer is free to select any suitable combination of RBSs and radio technology, e.g. NodeBs, or Wifi RBSs, and WCDMA, CDMA, Wifi radio technology.

Furthermore, it is to be understood that the communication network nodes described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the uplink scheduling services has been omitted in the figures, and will not be discussed in any further detail in this description. Similarly, it is to be understood that the described processes for establishing backhaul links are schematically described, e.g. conventional actions and calculations of the scheduling are omitted.

ABBREVIATIONS

ATM Asynchronous Transfer Mode
BGP Border Gateway Protocol
LTE Long Term Evolution
CDMA Code Division Multiple Access
FIB Forwarding Information Base
ILMI Interim Local Management Interface
IP Internet Protocol
ISIS Intermediate-System to Intermediate-System
MBH Mobile Backhaul
MPLS Multi-Protocol Label Switching
OSPF Open Shortest Path First
RBS Radio Base Station
RIP Routing Information Protocol
SDN Software Defined Network
SNMP Simple Network Management Protocol
UE User Equipment
WCDMA Wideband CDMA

The invention claimed is:

1. A method of operation in a first radio base station in a first radio access network, the method comprising:
   detecting one or more other radio base stations in the first radio access network that are connected to the first radio base station and obtaining address information from each connected radio base station;
   sending, for the purpose of routing calculations, the address information to a second radio base station in a second radio access network via an air interface provided by the second radio base station for serving user equipments in the second radio access network, the first radio base station being within a coverage area of the second radio base station;
   receiving routing information, pertaining to backhauling links for the first radio access network, in return from the second radio base station, the routing information computed by a backhauling entity that is associated with the second radio base station and has knowledge of a network topology of the first radio access network; and
   activating, based on the returned routing information, a backhaul link for the first radio base station, for routing user traffic associated with user equipments served by the first radio base station, wherein the backhaul link goes from the first radio base station through one or more of the connected radio base stations to reach a core network supporting the first radio access network and does not pass through the second radio access network, and wherein the backhauling entity of the second radio access network centralizes routing calculations for base stations in the first radio access network.

2. The method of claim 1, wherein sending the address information to the second radio base station comprises using a user equipment unit embedded in the first radio base station to communicate with the second radio base station via the air interface provided by the second base station.

3. The method of claim 1, wherein sending the address information to the second radio base station comprises sending a Short Message Service (SMS) message from the user equipment unit.

4. The method of claim 1, wherein the first radio access network operates as an embedded network with respect to the second radio access network, which operates as an embedding network, and wherein the method includes the radio base stations in the embedded network, including the first radio base station, relying on the backhauling entity of the embedded network to perform the routing calculations that determine the respective backhauling links used by the radio base stations in the embedded network, said respective backhauling links involving the embedded network and the supporting core network but not passing through the embedding network.

5. The method of claim 1, wherein detecting the one or more other radio base stations in the first radio access network that are connected to the first radio base station and obtaining address information from each connected radio base station comprises detecting communication activity on one or more communication ports of the first radio base station, and wherein sending the address information to the second radio base station includes sending port information identifying the communication ports on which the first radio base station detected the communication activity.

6. The method of claim 1, wherein, for each connected radio base station, the first radio base station communicates with the connected radio base station to obtain further information for the connected radio base station, including at least one of capability information, supported backhaul protocol information, and Quality-of-Service (QoS) information, and wherein the method further includes sending the further information for each connected radio base station in conjunction with sending the address information to the second radio base station.

7. The method of claim 1, further comprising receiving address information from one of the connected radio base stations that is not within the coverage area of the second radio base stations, the received address information being determined from the perspective of the connected radio base station, forwarding the received address information to the second radio base station via the air interface provided by the second radio base station, receiving routing information for the connected radio base station in return from the second radio base station, and forwarding the routing information received for the connected radio base station to the connected radio base station, for use at the connected radio base station in activating one or more backhaul links for the connected radio base station to use for routing user traffic associated with user equipments supported by the connected radio base station.

8. A first radio base station configured for operation in a first radio access network, the first radio base station comprising:
communication circuitry providing one or more communication ports for communicatively coupling to one or more other radio base stations in the first radio access network; and
processing circuitry configured to:
detect, via activity on one or more of the one or more communication ports, the one or more other radio base stations in the first radio access network that are connected to the first radio base station and obtaining address information from each connected radio base station;
send, for the purpose of routing calculations, the address information to a second radio base station in a second radio access network via an air interface provided by the second radio base station for serving user equipments in the second radio access network, the first radio base station being within a coverage area of the second radio base station;
receive routing information, pertaining to backhauling links for the first radio access network, in return from the second radio base station, the routing information computed by a backhauling entity that is associated with the second radio base station and has knowledge of a network topology of the first radio access network; and
activate, based on the returned routing information, a backhaul link for the first radio base station, for routing user traffic associated with user equipments served by the first radio base station, wherein the backhaul link goes from the first radio base station through one or more of the other radio base stations as intervening radio base stations, as needed, to reach a core network supporting the first radio access network and does not pass through the second radio access network, and wherein the backhauling entity of the second radio access network centralizes routing calculations for base stations in the first radio access network.

9. The first radio base station of claim 8, wherein the first radio base station further comprises a user equipment unit embedded in the first radio base station, and wherein the processing circuitry is configured to send the address information to the second radio base station using the user equipment unit, which communicates with the second radio base station via the air interface provided by the second base station.

10. The first radio base station of claim 8, wherein the processing circuitry is configured to use the user equipment unit to send the address information to the second radio base station as a Short Message Service (SMS) message.

11. The first radio base station of claim 8, wherein the first radio access network operates as an embedded network with respect to the second radio access network, which operates as an embedding network, and wherein the first radio base station is one among a number of radio base stations in the embedded network, each such radio base station configured to rely on the backhauling entity of the embedded network to perform the routing calculations that determine the respective backhauling links used by each such radio base station, said respective backhauling links involving the embedded network and the supporting core network but not passing through the embedding network.

12. The first radio base station of claim 8, wherein the processing circuitry is configured to detect the one or more other radio base stations in the first radio access network that are connected to the first radio base station and obtain address information from each connected radio base station by detecting communication activity on the one or more communication ports of the first radio base station, and wherein the processing circuitry is configured to include port information when sending the address information, said port information identifying the communication ports on which the first radio base station detected the communication activity.

13. The first radio base station of claim 8, wherein, for each connected radio base station, the processing circuitry is configured to communicate with the connected radio base station to obtain further information for the connected radio base station, including at least one of capability information, supported backhaul protocol information, and Quality-of-Service (QoS) information, and wherein the processing circuitry is configured to send the further information for each connected radio base station in conjunction with sending the address information to the second radio base station.

14. The first radio base station of claim 8, wherein the processing circuitry is further configured to:
   receive address information from one of the connected radio base stations that is not within the coverage area of the second radio base stations, the received address information being determined from the perspective of the connected radio base station;
   forward the received address information to the second radio base station via the air interface provided by the second radio base station;
   receive routing information for the connected radio base station in return from the second radio base station; and
   forward the routing information received for the connected radio base station to the connected radio base station, for use at the connected radio base station in activating one or more backhaul links for the connected radio base station to use for routing user traffic associated with user equipments supported by the connected radio base station.

15. A method performed by a backhauling entity operating in a second radio access network:
   receiving messages from an associated radio base station included in the second radio access network, the messages comprising address information for respective radio base stations included in a first radio access network that is separate from the second radio access network, said messages being sent by one or more of the radio base stations included in the first radio access network via an air interface provided by the associated radio base station for supporting user equipments operating in the second radio access network, and each said message comprising address information for a respective one of the base stations included in the first radio access network and indicating which other base stations in the first radio access network are connected to the respective base station, and further indicating whether the respective base station has a backhaul network connection;
   determining a topology of the first radio access network based on the address information respectively included in the received messages; and
   in response to the message received for any given radio base station in the first radio access network, performing routing calculations based on the address information included in the message, and further based on the determined topology of the first radio access network, and sending a return message to the associated radio base station, for transmission directly or indirectly to the given radio base station in the first radio access network, for use by the given radio base station in activating a backhaul link going through the first radio access network to a core network supporting the first radio access network, but not going through the second radio access network.

16. The method of claim 15, further comprising calculating updated routing information for one or more of the radio base stations in the first radio access network, based on receiving further messages from the same one or more radio base stations or from one or more other radio base stations in the first radio access network, and determining from the address information included in the further messages changes in the network topology of the first radio access network, and providing one or more return messages to the associated base station, for transmission directly or indirectly to radio base stations in the first radio access network targeted by the updated routing information.

17. A backhauling entity configured for operation in a second radio access network:
   communication circuitry configured to communicatively couple the backhauling entity to an associated radio base station included in the second radio access network; and
   processing circuitry configured to:
      receive, via the communication circuitry, messages from the associated radio base station, the messages comprising address information for respective radio base stations included in a first radio access network that is separate from the second radio access network, said messages being sent by one or more of the radio base stations included in the first radio access network via an air interface provided by the associated radio base station for supporting user equipments operating in the second radio access network, and each said message comprising address information for a respective one of the base stations included in the first radio access network and indicating which other base stations in the first radio access network are connected to the respective base station, and further indicating whether the respective base station has a backhaul network connection;
      determine a topology of the first radio access network based on the address information respectively included in the received messages; and
      in response to the message received for any given radio base station in the first radio access network, perform routing calculations based on the address information included in the message, and further based on the determined topology of the first radio access network, and sending a return message to the associated radio base station, for transmission directly or indirectly to the given radio base station in the first radio access network, for use by the given radio base station in activating a backhaul link going through the first radio access network to a core network supporting the first radio access network, but not going through the second radio access network.

18. The backhauling entity of claim 17, wherein the processing circuitry is further configured to calculate updated routing information for one or more of the radio base stations in the first radio access network, based on receiving further messages from the same one or more radio base stations or from one or more other radio base stations in the first radio access network, and determine from the address information included in the further messages changes in the network topology of the first radio access network, and provide one or more return messages to the associated base station, for transmission directly or indirectly to radio base stations in the first radio access network targeted by the updated routing information.

* * * * *